(12) United States Patent
Wang et al.

(10) Patent No.: US 8,638,722 B2
(45) Date of Patent: Jan. 28, 2014

(54) METHOD AND ARRANGEMENT IN A MOBILE COMMUNICATIONS NETWORK

(75) Inventors: Hai Wang, Beijing (CN); Yang Hu, Beijing (CN); Yin Liu, Beijing (CN); Xinghua Song, Beijing (CN); Jianfeng Wang, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 270 days.

(21) Appl. No.: 13/063,966

(22) PCT Filed: Sep. 16, 2009

(86) PCT No.: PCT/IB2009/006861
§ 371 (c)(1),
(2), (4) Date: Mar. 18, 2011

(87) PCT Pub. No.: WO2010/032109
PCT Pub. Date: Mar. 25, 2010

(65) Prior Publication Data
US 2012/0250608 A1    Oct. 4, 2012

Related U.S. Application Data

(60) Provisional application No. 61/098,130, filed on Sep. 18, 2008.

(51) Int. Cl.
*H04W 4/00* (2009.01)
(52) U.S. Cl.
USPC ............ 370/328; 370/342; 370/343; 370/345
(58) Field of Classification Search
USPC .......... 370/208, 328, 329, 350, 480, 342, 343
See application file for complete search history.

(56) References Cited

U.S. PATENT DOCUMENTS

| | | | | |
|---|---|---|---|---|
| 8,174,957 | B2* | 5/2012 | Ko et al. | 370/208 |
| 2001/0055320 | A1* | 12/2001 | Pierzga et al. | 370/480 |
| 2006/0050625 | A1* | 3/2006 | Krasner | 370/208 |
| 2009/0135803 | A1* | 5/2009 | Luo et al. | 370/350 |
| 2010/0165930 | A1* | 7/2010 | Zangi | 370/329 |

OTHER PUBLICATIONS

Motorola-"Uplink sounding for obtaining channel state information at Node 8 in EUTRA" 3GPP Draft: R1-071342 UL Sounding, 3rd Generation Partnership Project (3GPP), vol. RAN WG1, Apr. 3, 2007, XP050105282 Sections 1—Section: "Text Proposal" on p. 3/3.
Japanese Office Action Dated Oct. 25, 2013, 2 pages.
CATT, CMCC, RITT, Huawei, ZTE, Downlink Reference Signal Aspects for Non-Codebook Based Pre-Coding in TDD Mode, 3GPP TSG-RAN WG1 Meeting #48, Feb. 12, 2007, R1-070836.
Qualcomm Europe, UL RS structure Issues with Frequency Domain CDM, 3G PP TSG-RAN WG1 Meeting #47bis, Jan. 15, 2007, R1-070432.
Samsung, Nokia, Nokia Siemens Networks, Panasonic, TI, Joint proposal on uplink ACK/NACK channelization, 3GPP TSG-RAN WG1 Meeting #51b, Jan. 14, 2008, R1-080035.

* cited by examiner

*Primary Examiner* — Brian D Nguyen
*Assistant Examiner* — Toan Nguyen

(57) ABSTRACT

A method of operating a network node comprising one or more transmit antennas that are associated with a plurality of antenna ports includes transmitting a first user-equipment- (UE-) specific reference signal on a first antenna port and reusing the first UE-specific reference signal to transmit a second UE-specific reference signal on one of the first antenna port and a second antenna port. The second UE-specific reference signal is orthogonal to the first UE-specific reference signal.

14 Claims, 9 Drawing Sheets

METHOD AND ARRANGEMENT IN A MOBILE COMMUNICATIONS NETWORK

This application claims the benefit of U.S. Provisional Application No. 61/098,130, filed Sep. 18, 2008, the disclosure of which is fully incorporated herein by reference.

TECHNICAL FIELD

The present invention relates to method and arrangement in a mobile communications network having multiple antennas. In particular, the present invention relates to design of multiple UE-specific reference signals for non-codebook based multi-stream beamforming/precoding.

BACKGROUND

Multiple antenna techniques play an important role in modern wireless communication systems to provide improved system performance, including increased capacity and coverage, as well as improved service provisioning. One challenge with the implementation of multi-antenna techniques is the acquisition of channel state information (CSI) at the transmitter or the receiver. In general, the channel can be estimated through a predefined training sequence, which is often referred to as reference signal. Taking the downlink transmission as an example, the base station should transmit reference signals to mobile terminals so that the channel matrix can be estimated at the receiver side. With this estimated channel matrix, coherence demodulation can be carried out. Consequently the potential beamforming gain, spatial diversity gain and spatial multiplexing gain can be obtained. In addition, the reference signals can be used for channel quality measurements to support link adaptation. In the case of orthogonal frequency division multiplexing (OFDM) transmission, a straightforward design of reference signal is to insert known reference signals into the OFDM time-frequency grid.

In the 3GPP specifications 3GPP TS 36.211 V8.3.0 (2008-05), "Evolved Universal Terrestrial Radio Access (E-UTRA); Physical channels and modulation", 3GPP TS 36.212 V8.3.0 (2008-05) "Evolved Universal Terrestrial Radio Access (E-UTRA); Multiplexing and channel coding" and 3GPP TS 36.213 V8.3.0 (2008-05) "Evolved Universal Terrestrial Radio Access (E-UTRA); Physical layer procedures", two kinds of downlink reference signals are defined, i.e. the cell-specific reference signal and the UE-specific reference signal. (The above mentioned 3GPP specification refers to LTE release 8.)

Up to four cell-specific reference signals are defined corresponding to four antenna ports 0 to 3, as shown in FIG. 1, targeting to support codebook based multiple streams spatial multiplexing transmission A codebook is a predefined finite set consisting of a number of precoding matrices with different ranks. In codebook based precoding, the user equipment (UE) will first estimate the channel matrix based on the multiple cell-specific reference signals and then the UE applies an exhaustive search over all precoding matrices and reports the preferred precoding matrix indicator (PMI) to the base station, referred to as eNodeB in LTE, under certain criterions, e.g., maximizing system throughput. Note that the PMI can be overridden by the eNodeB. It should be noted that the channel matrix refers to the precoded channel information by multiplying precoding matrix, i.e. Y=H*W, where Y is the precoded channel matrix, H is channel matrix and W is precoding matrix.

However, only one UE-specific reference signal on antenna port 5 is defined, which is transmitted only on the resource blocks upon which the corresponding physical downlink shared channel (PDSCH) is mapped, as shown in FIG. 2, targeting to support non-codebook based single stream beamforming transmission In non-codebook based precoding, the precoding weight matrix applied both on UE-specific reference signals and the data signals is not retrieved from the codebook set but is directly calculated by the eNodeB in terms of some criterions, e.g., eigen-decomposition based or direction of arrival based criterion. In TDD (time Division Duplex) system, due to channel reciprocity, non-codebook based beamforming/precoding can reduce further uplink feedbacks and improve beamforming gain.

In the downlink transmission of the LTE system, both codebook based precoding and non-codebook based beamforming/precoding are supported for up to 4 transmit antennas.

The transmission mode switch between codebook based multiple streams spatial transmission is semi-statically configured via higher layer signalling.

However, future communication systems, e.g., LTE-Advance, are likely to employ more transmit antennas in order to reach more aggressive performance targets. Especially, for systems with e.g., 8 transmit antennas, extension of current codebook based precoding is needed from precoder and reference signal perspective.

On the other hand, non-codebook based multiple stream beamforming is considered to be one of the most important candidate technologies for future wireless communication systems. This enhanced multi-antenna technique can simultaneously make use of the beamforming gain to improve receive signal-to-noise-ratio (SNR) as well as multi-layer transmissions to improve the peak data rate. Compared to codebook based spatial multiplexing transmission, non-codebook based multi-stream beamforming has potentially the advantages of signalling overhead reduction and performance improvement.

However, in order to support non-codebook based multi-stream beamforming, it is necessary to define multiple UE-specific reference signals with least effort, especially based on existing antenna port 5 and the UE-specific reference signal as defined in LTE release 8.

SUMMARY

The present invention relates to an arrangement and method to design orthogonal UE-specific reference signals so that multiple UE-specific reference signals are feasible to support non-codebook-based multi-stream beamforming/precoding. This is achieved by re-using an existing UE-specific reference signal to obtain additional UE-specific reference signals being orthogonal to the existing UE reference signal.

Hence, according to a first aspect of the present invention a method in a network node of a mobile communication network is provided. The network node is associated with an antenna comprising a plurality of antenna ports using non-codebook-based multi-stream beamforming. In the method, a first UE specific reference signal is applied on a first antenna port, and the first UE specific reference signal is reused to be applied orthogonally on an antenna port. This antenna port may be the same as the first antenna port wherein the reused UE-specific reference signals are code division multiplexed in the same time-frequency resource elements as the first set of UE-specific reference signals or the antenna port may be a second antenna port wherein the reused UE-specific reference signals are multiplexed in different time-frequency resource elements than the first set of UE specific reference signals.

According to a second aspect of the present invention a network node of a mobile communication network is provided. The network node is associated with an antenna comprising a plurality of antenna ports using non-codebook-based multi-stream beamforming. Further, the network node comprises a processor configured to apply a first UE specific reference signal on a first antenna port, and to reuse the first UE specific reference signal to be applied orthogonally on an antenna port.

In order to keep the orthogonality among the multiple UE-specific reference signals in a cell, different embodiments are proposed with some cost, in terms of e.g., overhead, channel estimation performance etc. These embodiments can be divided into three categories as:

From performance perspective, multiple UE-specific reference signals are in this embodiment multiplexed in different time-frequency resource elements. This is used in scheme 1 where multiple antenna ports reuse the existing UE-specific reference signal.

From overhead perspective, multiple UE-specific reference signals are code-division multiplexed in a set of resource elements in the allocated resource blocks to share the same antenna port 5 in other embodiments. The requirement of multiple stream transmission moves the operating point to higher SNR, which is helpful to satisfy the separation of multiple UE-specific reference signals and further channel estimation accuracy/performance. This is used in schemes 2-4. In scheme 2, cyclic shifts of the existing UE-specific reference signal are used for the additional UE-specific reference signals. In scheme 3, orthogonal covers based on the existing UE-specific reference signal, are used for the additional UE-specific reference signals and in scheme 4, space-frequency block codes (SFBC) are applied on the existing UE-specific reference signal to obtain the additional UE-specific reference signals. In addition, a combination of scheme 1 and at least one of schemes 2-4 can also be used if a compromise between overhead and performance is desired.

At the receiver, the effective channel state information used to demodulate and decode different streams can be estimated via multiple UE-specific reference signals, e.g., pilot signals.

An advantage with embodiments of the present invention is that support of non-codebook based multiple stream downlink transmission is provided. The effective channel state information used to demodulate and decode different streams can be estimated via multiple UE-specific reference signals.

A further advantage with embodiments of the present invention is the low complexity to generate multiple UE-specific reference signals, since more antenna ports or simple operation is based on the existing UE-specific reference signal.

A further advantage with embodiments of the present invention is the flexible switch for rank adaptation, i.e., the adjustment of the number of antenna ports or UE-specific reference signals.

A further advantage with embodiments of the present invention is that efficient overhead reduction is provided. Multiple UE-specific reference signals in code-division multiplexing share the same resource elements in antenna port 5, i.e., Schemes 2-4. In addition, Scheme 5 considers both overhead and performance.

A yet further advantage with embodiments of the present invention is that it can easily be introduced into the later LTE releases. The introduction of multiple UE-specific reference signals is easily based on the existing antenna port 5 or the existing UE-specific reference signal

DETAILED DESCRIPTION

Figure 1:
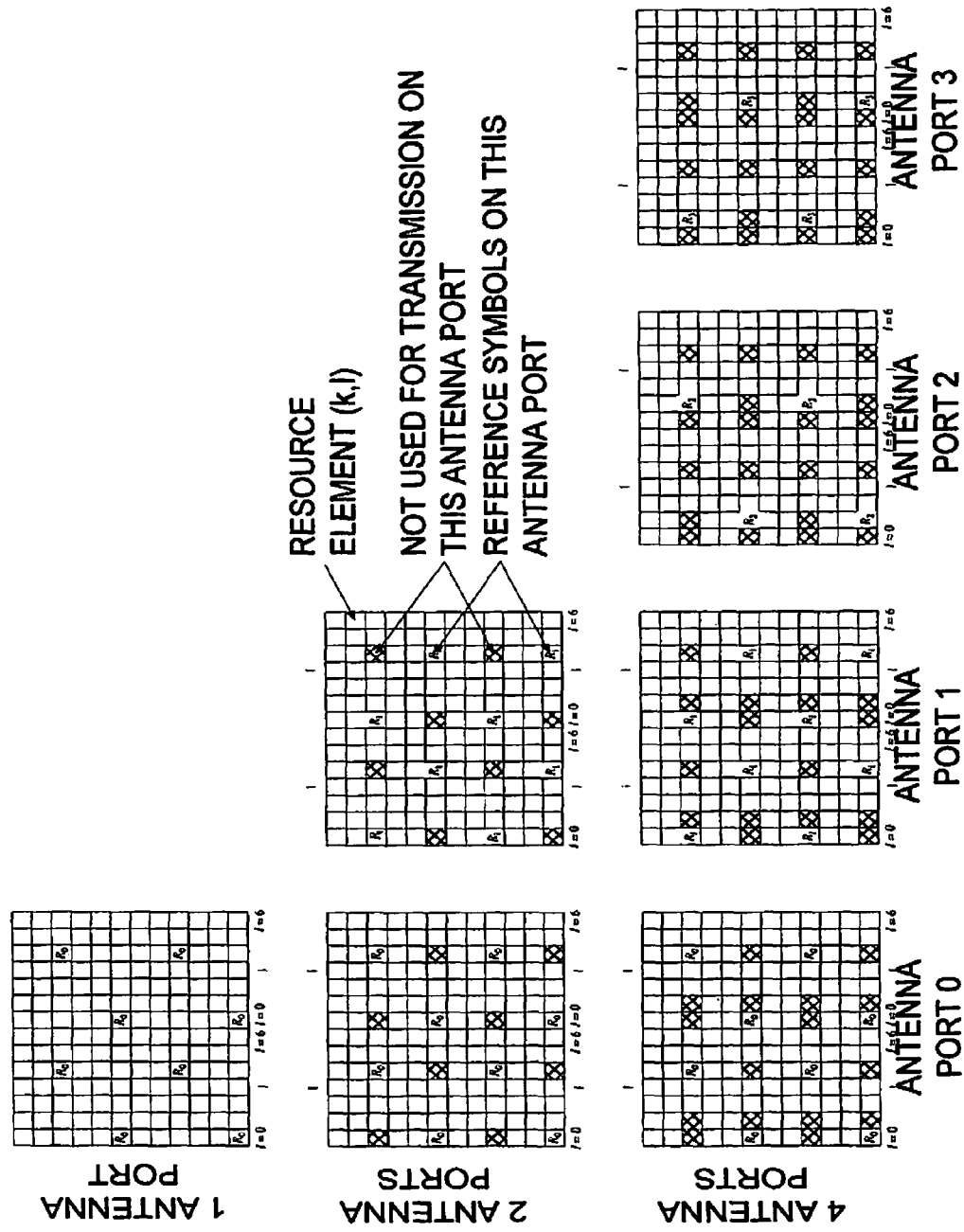
FIG. 1 illustrates multiple downlink cell-specific reference signals for LTE with normal CP (cyclic prefix) according to prior art.
Figure 2:
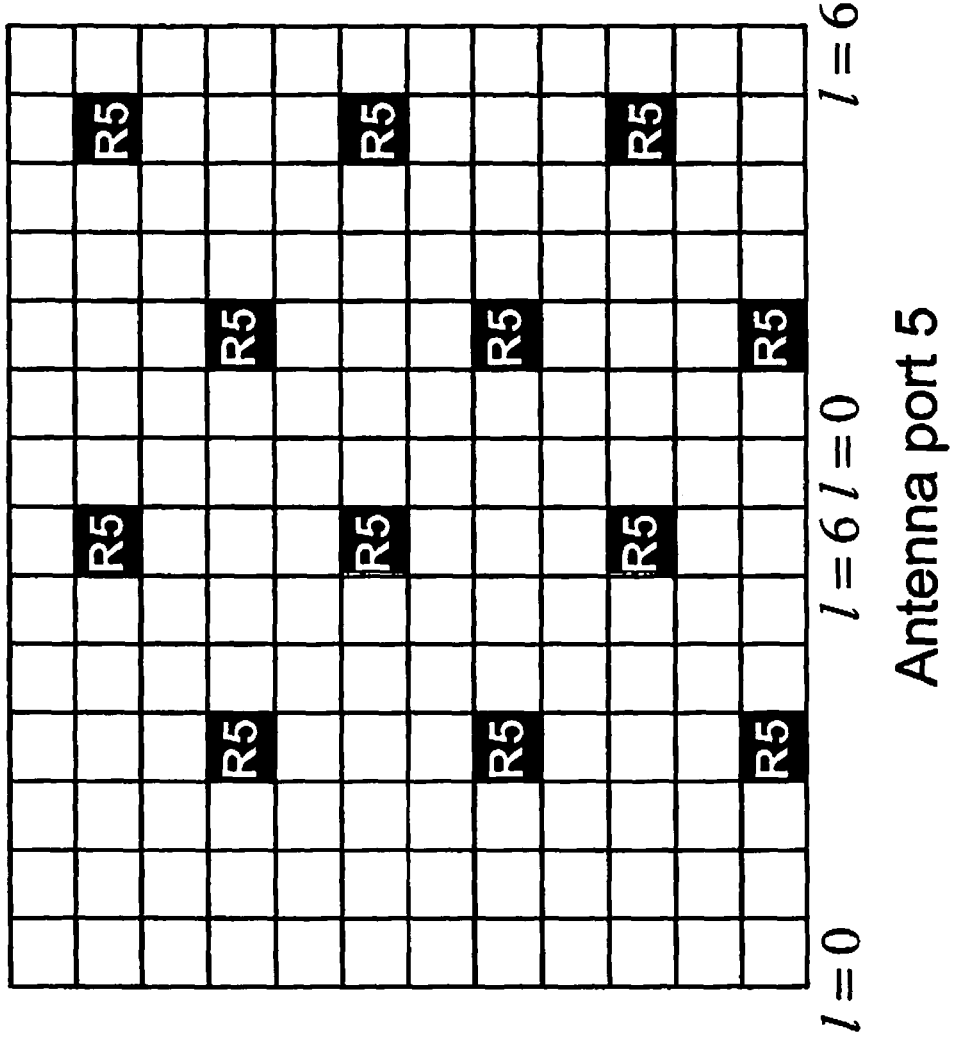
FIG. 2 illustrates one downlink UE-specific reference signal for LTE with normal CP according to prior art.

The present invention will be described more fully hereinafter with reference to the accompanying drawings, in which preferred embodiments of the invention are shown. The invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

Moreover, those skilled in the art will appreciate that the means and functions explained herein below may be implemented using software functioning in conjunction with a programmed microprocessor or general purpose computer, and/or using an application specific integrated circuit (ASIC). It will also be appreciated that while the current invention is primarily described in the form of methods and devices, the invention may also be embodied in a computer program product as well as a system comprising a computer processor and a memory coupled to the processor, wherein the memory is encoded with one or more programs that may perform the functions disclosed herein.

Figure 9:
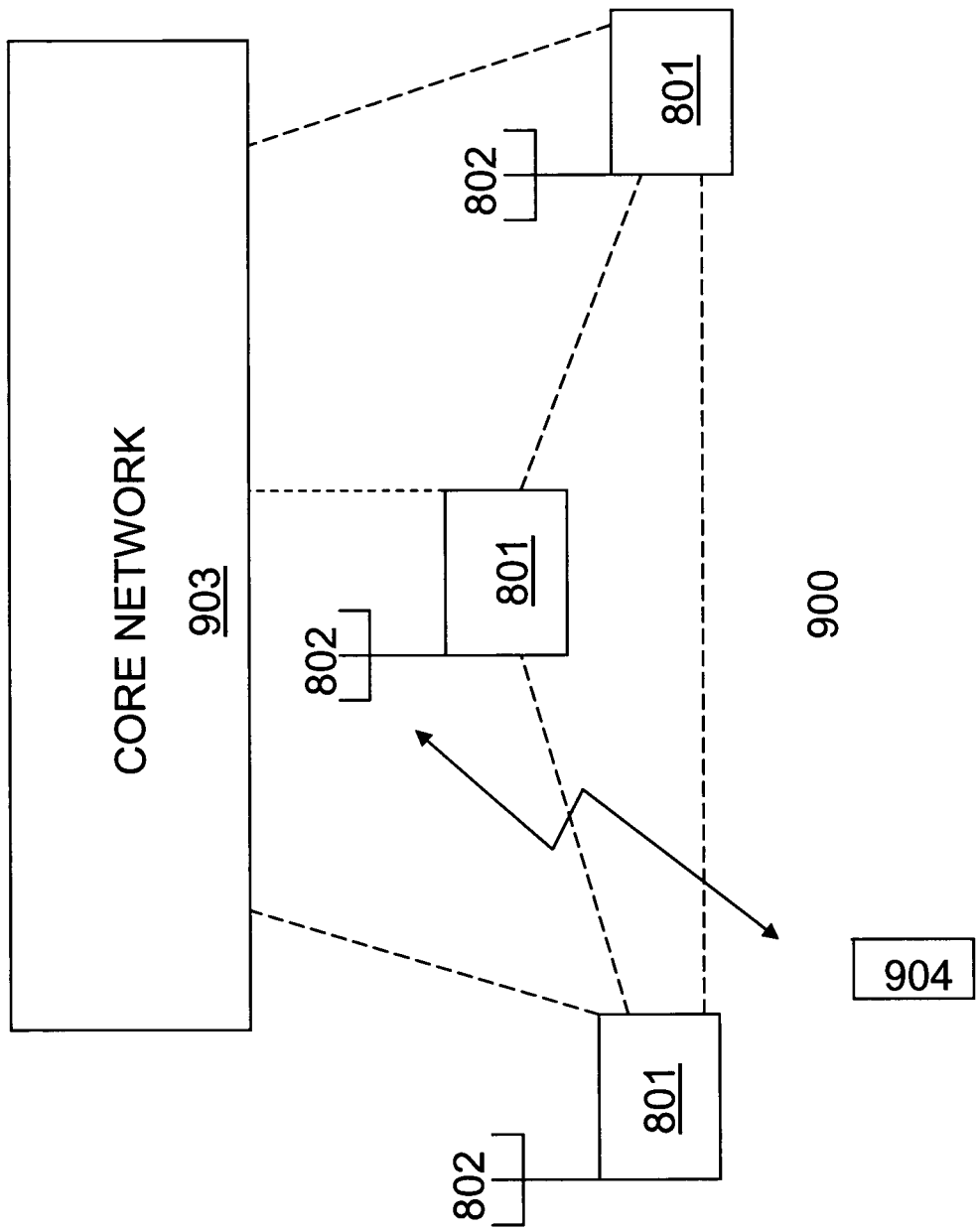
FIG. 9 illustrates schematically a LTE network wherein the embodiments of the present invention may be implemented.

FIG. 9 illustrates a Long Term Evolution (LTE) network 900 wherein the embodiments of the present invention may be implemented. Radio base stations 801 referred to as eNode Bs are connected to a core network 903 and are also interconnected. Each eNode B 801 has an antenna 802 comprising a plurality of antenna ports. The eNode Bs communicate wirelessly with user equipments 904.

Although the embodiments of the present invention are described in the context of a mobile communication network based on the LTE (Long Term Evolution) standard, the present invention is lot limited to LTE but can also be used in networks using multiple UE-specific reference signals for enabling non-codebook based multi-stream beamforming.

Figure 7:
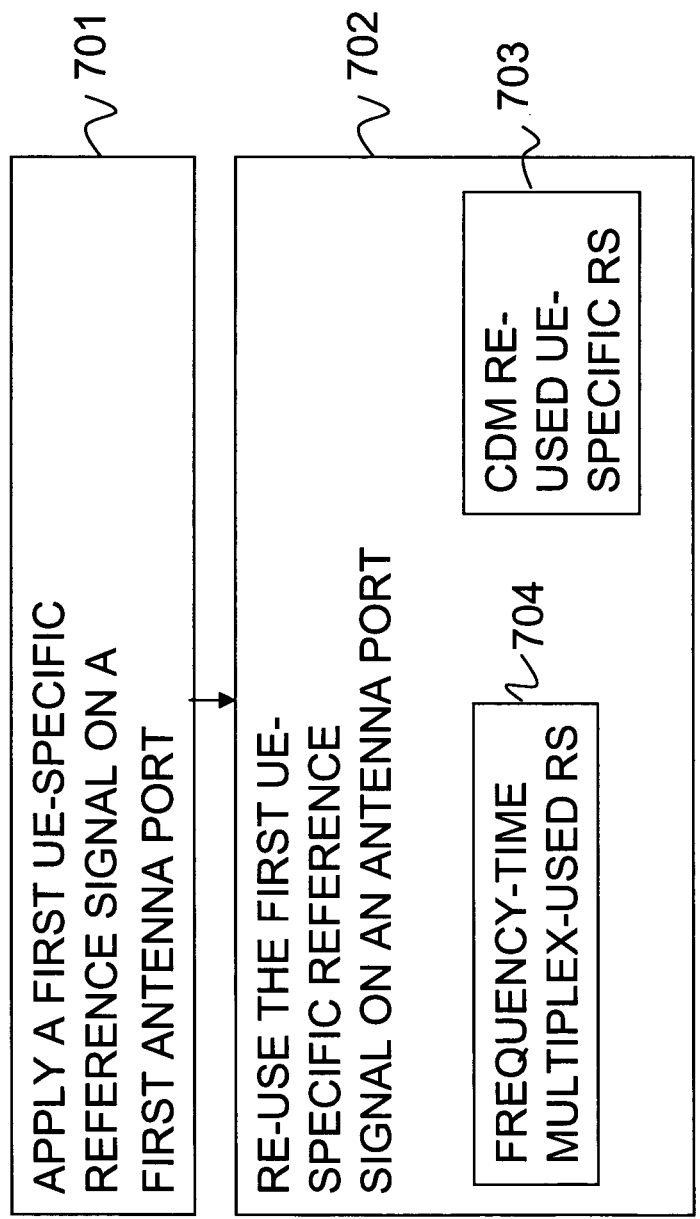
FIG. 7 is a flowchart of the method according to embodiments of the present invention.

In order to obtain multiple UE-specific reference signals for multiple streams, a first UE specific reference signal is applied 701 on a first antenna port, and the first UE specific reference signal is reused 702 to be applied orthogonally on an antenna port according to the flowchart of FIG. 7.

According to a first embodiment, referred to as scheme 1, the reused first UE specific reference signal are multiplexed 704 on a second antenna port in different time-frequency resource elements than the first UE specific reference signal applied on the first antenna port.

In LTE, release 8, the antenna port 5 has been specified for the UE-specific reference signals as described above. In order to reuse the reference signal for multiple stream transmission according to this embodiment, more antenna ports can be defined, in which the resource elements used for UE-specific reference signals are occupied by only one antenna port, the same as the mapping of multiple Cell-specific reference signals. For instance, 4 antenna ports of 5 to 8 can support up to 4 streams downlink data transmission.

Figure 3:
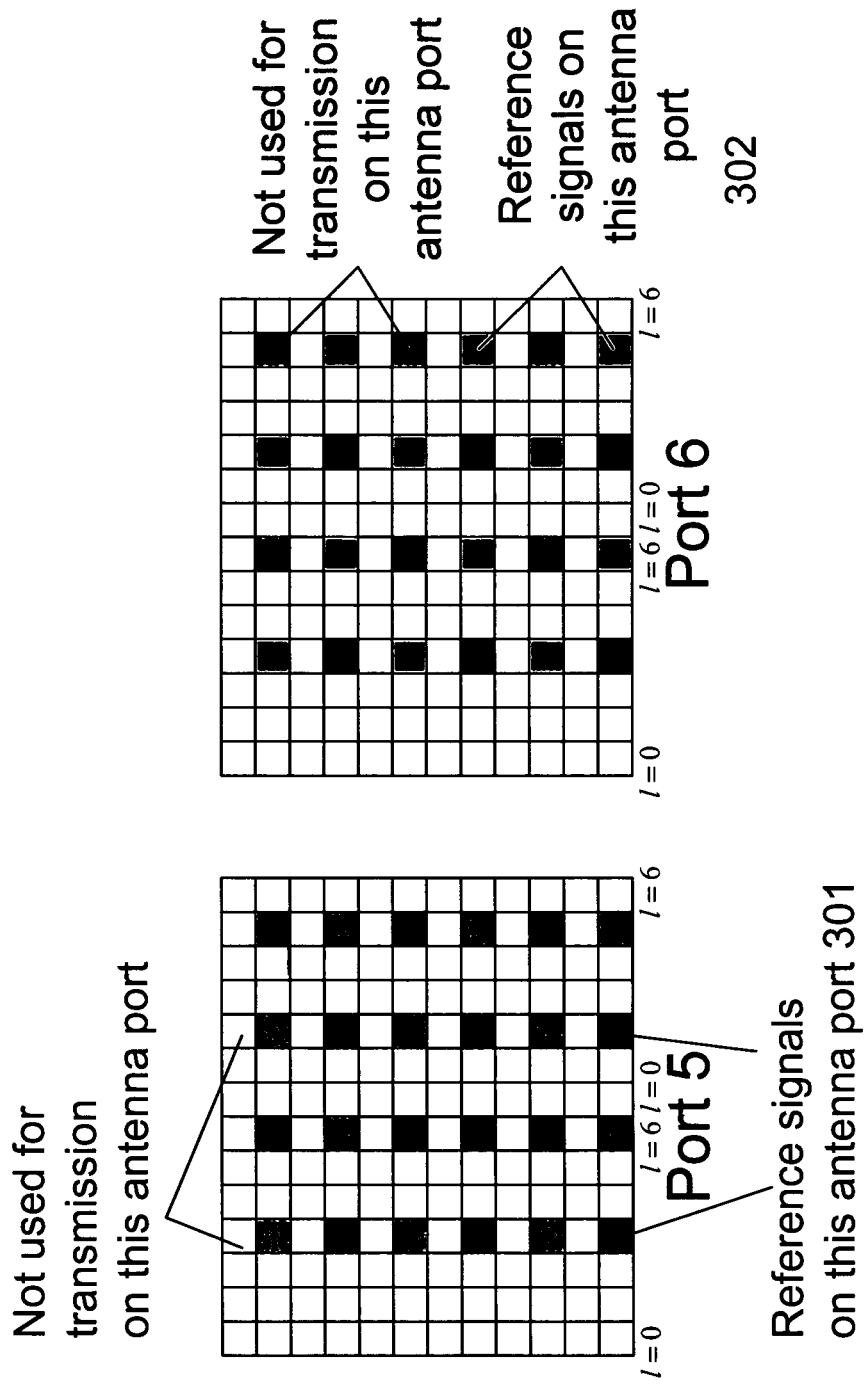
FIG. 3 illustrates reuse of the same UE-specific reference signals for two antenna ports according to one embodiment of the present invention.

FIG. 3 shows the basic structure of two antenna ports only for illustration. More antenna ports have similar design. Hence UE-specific reference signals are transmitted from port 5 and from port 6, where the resource elements 301 of port 5 used for the UE-specific reference signals are orthogonal to the resource elements 302 of port 6 used for the UE-specific reference signals.

Scheme 1 implies that higher channel estimation accuracy can be achieved due to interference among the antenna ports is avoided.

In contrast to scheme 1, the UE-specific reference signals are orthogonally code-division multiplexed 703 in a set of resource elements in the allocated resource blocks to share the same antenna port (antenna port 5) according to further embodiments referred to as scheme 2-4, i.e., the reused first UE specific reference signal is applied on the first antenna port sharing the same time-frequency resource elements as the first UE specific reference signal by code division multiplexing 703 the reused first UE specific reference signal in a set of resource elements.

Figure 4:
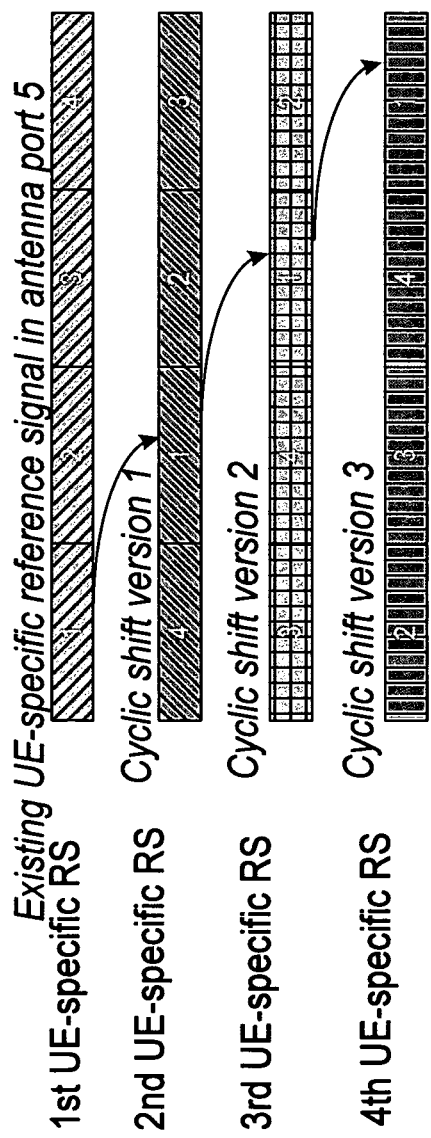
FIG. 4 illustrates generation of multiple UE-specific reference signals by cyclic shifts according to embodiments of the present invention.
Figure 4:
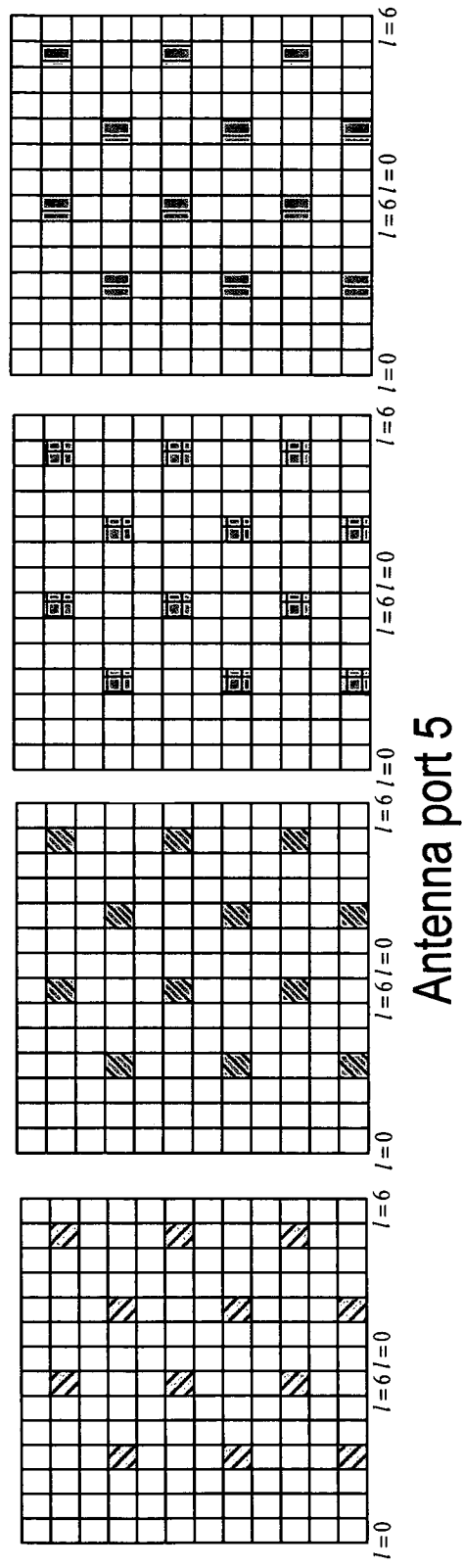

Since the existing UE-specific reference signals on antenna port 5 in LTE are a pseudo-random sequence, multiple UE-specific reference signals can be generated by introducing cyclic shifts to guarantee good auto-correlation (orthogonality) among the UE-specific reference signals according to a second embodiment referred to as scheme 2. FIG. 4 shows 4 cyclic shifted sequences based on the existing UE-specific reference signals as an example. Thus, a first UE-specific reference signal is sent on antenna port 5. In addition a second, a third and a fourth UE-specific reference signal are also applied on antenna port 5 on the same resource elements as the first UE-specific reference signal. However, the second UE-specific reference signal is a cyclic version of the first UE-specific reference signal, the third UE-specific reference signal is a cyclic version of the second UE-specific reference signal and the fourth UE-specific reference signal is a cyclic version of the third UE-specific reference signal. It should be noted that more and less than 4 UE-specific reference signals can be generated in the similar way, i.e., antenna port 5 can by using scheme 2 transmit multiple UE-specific reference signals wherein each reference signal is a cyclic shifted version of the existing UE-specific reference signal.

Accordingly, scheme 2 results in lower overhead than scheme 1 since the same antenna port (e.g., antenna port 5) can be used for multiple UE-specific reference signals and the same sequence for the transmission of multiple streams can be kept, i.e., in scheme 2, a code division multiplex scheme is used, where each layer can share the same reference signals but with different orthogonal cover.

Further, flexible switch for rank adaptation is possible due to selection of multiple UE-specific reference signals instead of multiple antenna ports. Another advantage with scheme 2 is the flexible generation of multiple UE-specific reference signals, e.g., different shift intervals.

Figure 5:
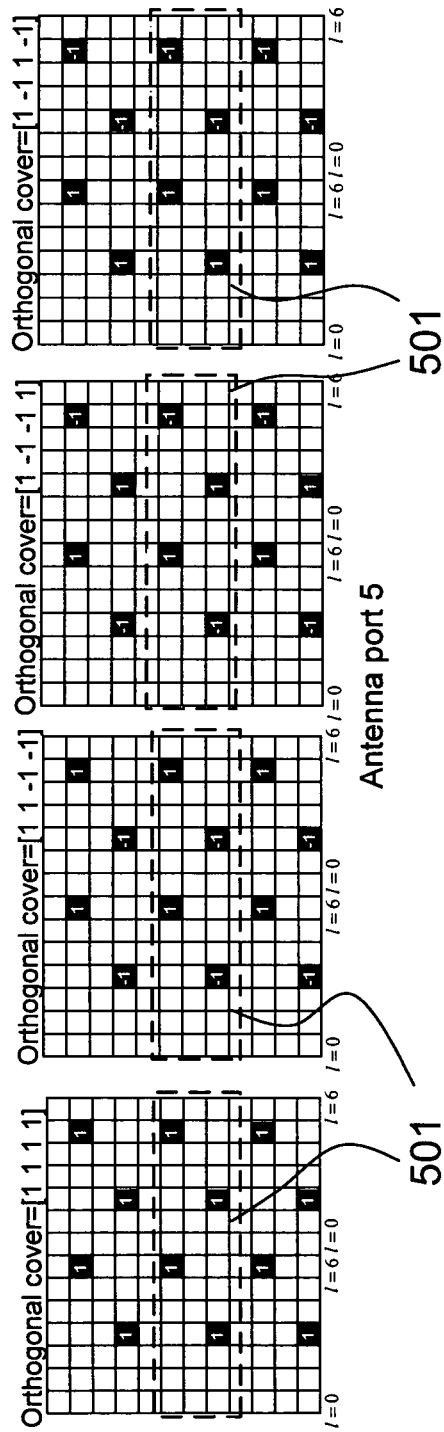
FIG. 5 illustrates generation of multiple UE-specific reference signals by length-4 orthogonal covers according to one embodiment of the present invention.

A further scheme, referred to as scheme 3 follows the same principle as scheme 2, i.e., multiple UE-specific reference signals code-division multiplexed (CDM) in the time-frequency domain share the same antenna port. In order to keep orthogonality between the multiple UE-specific reference signals, orthogonal code sequences with length-M can be applied on the existing UE-specific reference signal. The number of the UE-specific reference signals is decided by the length of the orthogonal codes. FIG. 5 shows the generation of 4 UE-specific reference signals being orthogonal covers with length 4 of the existing UE reference signal. Thus, a first UE-specific reference signal is sent on antenna port 5 (with an orthogonal cover of [1 1 1 1]. In addition a second, a third and a fourth UE-specific reference signal are also applied on antenna port 5 on the same resource elements as the first UE-specific reference signal. However, the second UE-specific reference signal is an orthogonal cover of the first UE-specific reference signal, wherein the orthogonal code [1 1 −1 −1] is applied. The third UE-specific reference signal is an orthogonal cover of the first and second UE-specific reference signal, wherein the orthogonal code [1 −1 −1 1] is applied. The fourth UE-specific reference signal is an orthogonal cover of the first, second and third UE-specific reference signal, wherein the orthogonal code [1 −1 1 −1] is applied. The placement of the orthogonal covers is marked by the dashed boxes 501 and is just an example, giving the estimated area of each UE-specific reference signal.

Accordingly, scheme 3 provides lower overhead than scheme 1 due to the sharing of the same antenna port and the same sequence for the transmission of multiple streams can be kept. Flexible switch for rank adaptation due to selection of multiple UE-specific reference signals instead of multiple antenna ports and flexible generation of multiple UE-specific reference signals, e.g., length-2 Walsh codes, length-3 DFT codes and length-4 Walsh codes and so on are achieved.

Figure 6:
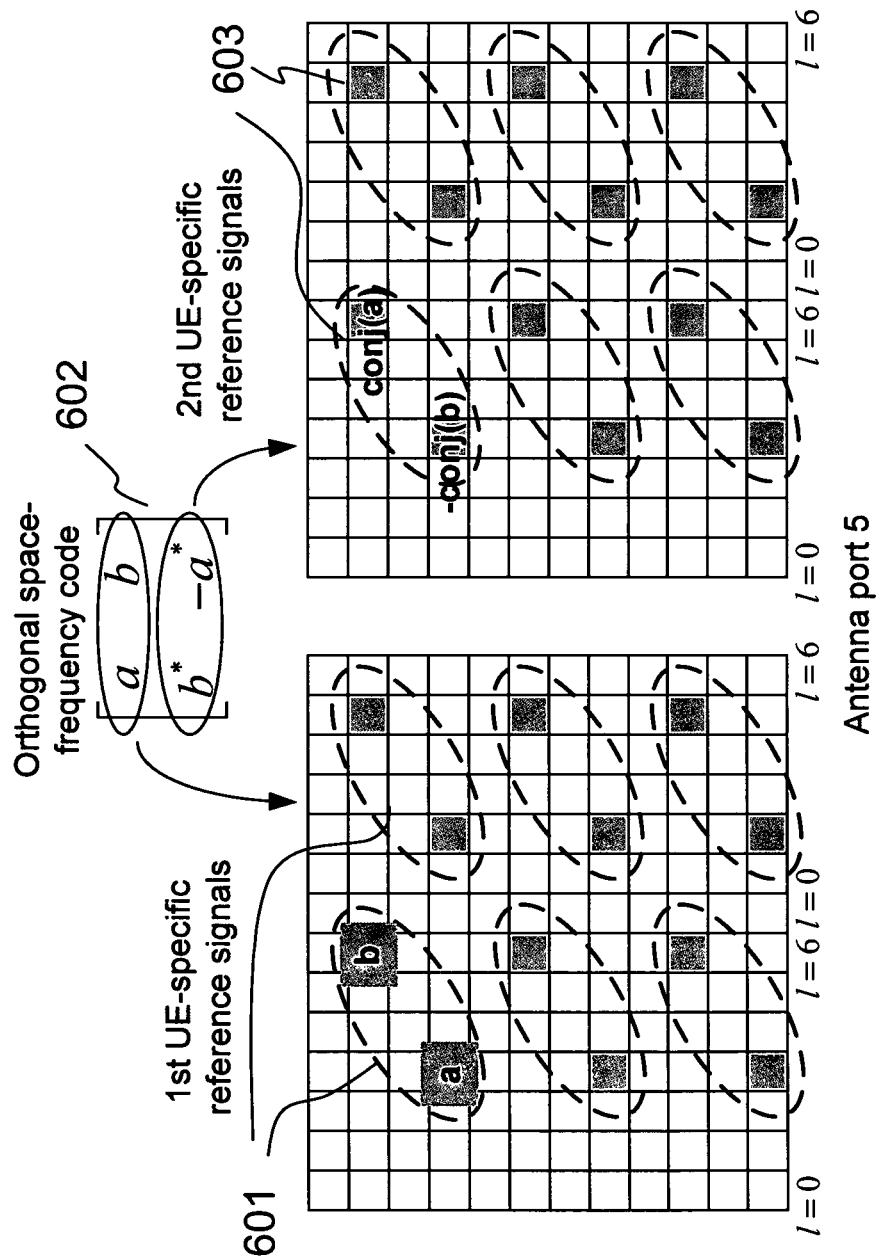
FIG. 6 illustrates generation of 2 UE-specific reference signals by a 2×2 Alamouti code according to an embodiment of the present invention.

A further scheme, referred to as scheme 4 follows the same principle as schemes 2 and 3, i.e., multiple UE-specific reference signals code-division multiplexed (CDM) in the time-frequency domain share the same antenna port. In order to keep orthogonality between the multiple UE-specific reference signals, space frequency block codes (SFBC) in the space-frequency domain can be applied to generate multiple UE-specific reference signals. An example of SFBC structures is a 2×2 Alamouti matrix. FIG. 6 shows the generation of 2 UE-specific reference signals based on a 2×2 Alamouti matrix 602, where two adjacent resource elements are grouped 601 as an example. In the first UE-specific reference signal, two adjacent resource elements are grouped 601 and a SFBC 603 is applied on the group 601 resulting in the second UE-specific reference signal 603.

Two UE-specific reference signals can be generated by e.g., applying the SFBC according to the matrix below. $X_1$ and $X_2$ are reference signals of $1^{st}$ stream and $X_1^x$ and $X_2^x$ are the reference signals of $2^{nd}$ stream.

$$\begin{bmatrix} X_1 & X_2 \\ X_2^* & -X_1^* \end{bmatrix} \begin{array}{l} \longrightarrow \text{1st } UE\text{-specific reference signals} \\ \longrightarrow \text{2nd } UE\text{-specific reference signals} \end{array}$$

Three UE-specific reference signals can be generated by e.g., applying the SFBC according to the matrix below. $X_1$, $X_2$ and $X_3$ are reference signals of $1^{st}$ stream and $X_1^x$, $X_2^x$ and $X_3^x$ are the complex conjugation of X1, X2 and X3, accordingly.

$$\begin{bmatrix} X_1 & X_2^* & X_3^* & 0 \\ -X_2 & X_1^* & 0 & -X_3^* \\ -X_3 & 0 & X_1^* & X_2^* \end{bmatrix} \begin{array}{l} \longrightarrow \text{1st } UE\text{-specific reference signals} \\ \longrightarrow \text{2nd } UE\text{-specific reference signals} \\ \longrightarrow \text{3rd } UE\text{-specific reference signals} \end{array}$$

Four UE-specific reference signals can be generated by e.g., applying the SFBC according to the matrix below. $X_1$, $X_2$, $X_3$ and $X_4$ are reference signals of $1^{st}$ stream and $X_1^x$, $X_2^x$, $X_3^x$ and $X_4^x$ are the complex conjugation of X1, X2 and X3, accordingly.

$$\begin{bmatrix} X & -X_2 & \frac{X_3^*}{\sqrt{2}} & \frac{X_3^*}{\sqrt{2}} \\ X_2 & X_1 & \frac{X_3^*}{\sqrt{2}} & \frac{-X_3^*}{\sqrt{2}} \\ \frac{X_3}{\sqrt{2}} & \frac{X_3}{\sqrt{2}} & \frac{-X_1 - X_1^* + X_2 - X_2^*}{2} & \frac{X_2 - X_2^* + X_1 - X_1^*}{2} \\ \frac{X_3}{\sqrt{2}} & \frac{-X_3}{\sqrt{2}} & \frac{-X_2 - X_2^* + X_1 - X_1^*}{2} & \frac{-X_1 - X_1^* - X_2 + X_2^*}{2} \end{bmatrix} \begin{array}{l} \longrightarrow \text{1st } UE\text{-specific reference signals} \\ \longrightarrow \text{2nd } UE\text{-specific reference signals} \\ \longrightarrow \text{3rd } UE\text{-specific reference signals} \\ \longrightarrow \text{4th } UE\text{-specific reference signals} \end{array}$$

Accordingly, scheme 4 provides lower overhead than scheme 1 due to the sharing of the same antenna port and the same sequence for the transmission of multiple streams can be kept. Flexible switch for rank adaptation due to selection of multiple UE-specific reference signals instead of multiple antenna ports.

According to a yet further embodiment, scheme 1 is combined with at least one of schemes 2-4. This is referred to as scheme 5. This embodiment provides a compromise between overhead and channel estimation accuracy. For instance, 2 antenna ports with 2 code-division multiplexed UE-specific reference signals can support the transmission of up to 4 streams, where 2 UE-specific reference signals are generated using any of the schemes 2-4. As an example, when one UE-specific reference signal is required (transmission of one stream), antenna port 1 may be used, when two UE-specific reference signals are required, antenna ports 5 and 6 may be used. In addition if three UE-specific reference signals are required, one reference signal may be sent from antenna port 5 and two reference signals may be sent from antenna port 6 using any of the schemes 2-4.

Figure 8:
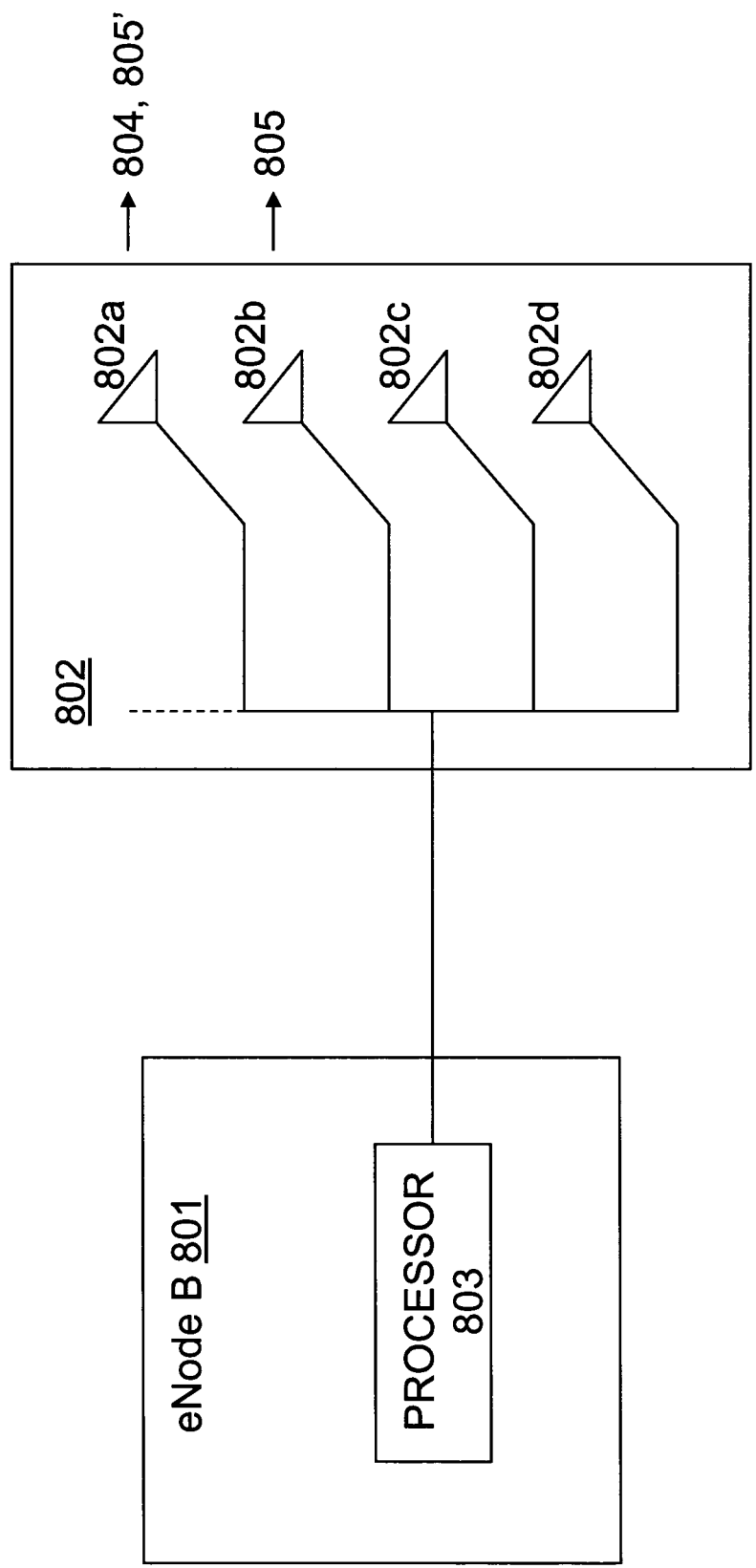
FIG. 8 illustrates schematically the network node with the associated antenna ports according to embodiments of the present invention.

Moreover, the present invention relates to a network node 801 such as a base station, also referred to as an eNodeB in LTE as illustrated in FIG. 8. The network node is associated with an antenna 802 comprising a plurality of antenna ports using non-codebook-based multi-stream beamforming. The network node comprises a processor 803 configured to apply a first UE specific reference signal 804 on a first antenna port 802*a*, and to reuse the first UE specific reference signal to be applied orthogonally on an antenna port 802*a;b*.

According to the first embodiment, the processor 803 is configured to multiplex the reused first UE specific reference signal 805' on a second antenna port in different time-frequency resource elements than the first UE specific reference signal applied on the first antenna port.

According to further embodiments, as explained above, the processor 803 is configured to apply the reused first UE specific reference signal on the first antenna port sharing the same time-frequency resource elements as the first set of UE specific reference signals. The orthogonality between the plurality of UE-specific reference signals is achieved in these embodiments by the processor 803 which is configured to code division multiplex the reused first UE specific reference signal 805 in a set of resource elements.

It should be noted that the network node 801 also comprises other standard devices. However, these devices are not considered to be essential for the present invention and are therefore not shown in figures or explained further.

The present invention is not limited to the above-described preferred embodiments. Various alternatives, modifications and equivalents may be used. Therefore, the above embodiments should not be taken as limiting the scope of the invention, which is defined by the appending claims.

The invention claimed is:

1. A method of operating a network node of a mobile communication network, wherein the network node comprises one or more transmit antennas that are associated with a plurality of antenna ports, the method comprising:
   transmitting a first user-equipment- (UE-) specific reference signal on a first antenna port; and
   reusing the first UE-specific reference signal to transmit a second UE-specific reference signal on one of the first antenna port and a second antenna port, wherein the second UE-specific reference signal is orthogonal to the first UE-specific reference signal.

2. The method of claim 1, transmitting the second UE-specific reference signal comprises transmitting the second UE-specific reference signal on a second antenna port in different time-frequency resource elements than are used to transit the first UE specific reference signal on the first antenna port.

3. The method of claim 1, wherein transmitting the second UE-specific reference signal comprises transmitting the second UE-specific reference signal on the first antenna port sharing the same time-frequency resource elements as the first UE specific reference signal.

4. The method of claim 3, wherein reusing the first UE specific reference signal further comprises code division multiplexing the second UE-specific reference signal with the first UE-specific reference signal in a set of time-frequency resource elements.

5. The method of claim 4, wherein reusing the first UE-specific reference signal to transmit the second UE-specific signal comprises generating the second UE-specific signal by cyclically shifting the first UE-specific reference signal.

6. The method of claim 4, wherein reusing the first UE-specific reference signal to transmit the second UE-specific signal comprises generating the second UE-specific signal based on an orthogonal cover of the first UE-specific reference signal.

7. The method of claim 4, wherein reusing the first UE-specific reference signal comprises generating the second UE-specific signal by applying a space-frequency block code (SFBC) to the first UE-specific reference signal.

8. A network node of a mobile communication network, wherein the network node is associated a plurality of antenna ports, and wherein the network node comprises:
   one or more transmit antennas that are associated with a plurality of antenna ports; and
   a processor operable to:
   transmit a first user-equipment- (UE-) specific reference signal on a first antenna port; and
   reuse the first UE-specific reference signal to transmit a second UE-specific reference signal on one of the first antenna port and a second antenna port, wherein the second UE-specific reference signal is orthogonal to the first UE-specific reference signal.

9. The network node of claim 8, wherein the processor is operable to transmit the second UE-specific reference signal by transmitting the second UE-specific reference signal on a second antenna port in different time-frequency resource elements than are used to transit the first UE specific reference signal on the first antenna port.

10. The network node of claim 8, wherein the processor is operable to transmit the second UE-specific reference signal by transmitting the second UE-specific reference signal on the first antenna port sharing the same time-frequency resource elements as the first UE specific reference signal.

11. The network node of claim 10, wherein the processor is further operable to reuse the first UE-specific reference signal by comprises code division multiplexing the second UE-specific reference signal with the first UE-specific reference signal in a set of time-frequency resource elements.

12. The network node of claim 11, wherein the processor is further operable to reuse the first UE-specific reference signal to transmit the second UE-specific signal by generating the second UE-specific signal by cyclically shifting the first UE-specific reference signal.

13. The network node of claim 11, wherein the processor is further operable to reuse the first UE-specific reference signal to transmit the second UE-specific signal by generating the second UE-specific signal based on an orthogonal cover of the first UE-specific reference signal.

14. The network node of claim 11, wherein the processor is further operable to reuse the first UE-specific reference signal to transmit the second UE-specific signal by generating the second UE-specific signal by applying a space-frequency block code (SFBC) to the first UE-specific reference signal.

* * * * *

UNITED STATES PATENT AND TRADEMARK OFFICE
CERTIFICATE OF CORRECTION

| | |
|---|---|
| PATENT NO. | : 8,638,722 B2 |
| APPLICATION NO. | : 13/063966 |
| DATED | : January 28, 2014 |
| INVENTOR(S) | : Wang et al. |

It is certified that error appears in the above-identified patent and that said Letters Patent is hereby corrected as shown below:

On the Title Page, in item (56), under "OTHER PUBLICATIONS", in Column 2, Line 10, delete "3G PP" and insert -- 3GPP --, therefor.

In the Specification:

In Column 1, Line 54, delete "transmission" and insert -- transmission. --, therefor.

In Column 2, Line 6, delete "transmission" and insert -- transmission. --, therefor.

In Column 4, Line 2, delete "signal" and insert -- signal. --, therefor.

In Column 4, Line 65, delete "lot" and insert -- not --, therefor.

In the Claims:

In Column 8, Lines 53-54, in Claim 2, delete "than are used to transit" and insert -- that are used to transmit --, therefor.

In Column 10, Line 1, in Claim 9, delete "than are used to transit" and insert -- that are used to transmit --, therefor.

Signed and Sealed this
Twenty-second Day of July, 2014

Michelle K. Lee
*Deputy Director of the United States Patent and Trademark Office*